Inventor
T. Hindmarch
By Glascot Downing Neubold Attys.

April 10, 1956 T. HINDMARCH 2,741,137
TURBINE-DRIVEN POWER INSTALLATIONS
Filed May 8, 1951 3 Sheets-Sheet 3

Inventor
T. Hindmarch
By Hancock Downing Seeble
Attys.

United States Patent Office 2,741,137
Patented Apr. 10, 1956

2,741,137

TURBINE-DRIVEN POWER INSTALLATIONS

Thomas Hindmarch, Chesham, England

Application May 8, 1951, Serial No. 225,248

10 Claims. (Cl. 74—377)

This invention relates to ship propulsion or other turbine driven power installations, the turbines being either steam or gas turbines as desired.

Hitherto it has been usual to employ one complete turbine for one direction of running and to reverse the direction of running, either the complete turbine is reversed or only part of the complete turbine especially in the case where the output in the reverse direction is lower than in the forward direction, or, as a third alternative, the reverse direction is obtained by the use of a second turbine which causes the driven shaft to rotate in the opposite direction of rotation to that of the other or main turbine. Various devices to couple and/or uncouple if necessary the turbine shaft from or to the output or driven shaft have been used, be it for one turbine or a section thereof to act as a brake against the other one at the moment of reversal, but none of these devices permits the driven or output shaft (in a ship the propeller shaft) to be driven in both directions of rotation or to remain stationary, and at the same time to derive the power for both directions of rotation from one complete turbine only running in one and the same direction all the time and be it that this turbine unit comprises for instance one or more high pressure and one or more low pressure sections, all of which form a complete turbine unit.

The object of the present invention is to simplify such drives as compared with existing arrangements.

The invention consists in a coupling between one or more turbines adapted to rotate in one direction only and an output shaft which includes forward and reverse gearing operable for engagement and disengagement by the engagement or disengagement of fluid pressure operated clutches associated with the said forward and reverse gearing, means being provided to substitute air for substantially the whole of the operating fluid in the clutch or clutches being disengaged and to gradually increase the volume of the fluid within the clutch or clutches being engaged to drive out the air through a restricted orifice to initially engage the clutch or clutches resiliently and then to increase the pressure to complete the engagement.

The gradual admission of the fluid at initially low pressure may be obtained by means of a dashpot control, or by a reducing valve, or by means of an equalising compressible gas vessel with or without spring loaded piston and means of varying its capacity, or any other means, all of which enable gradual and adjustable admission of the operating fluid as may be desired.

The arrangement is such that, owing to the fluid being fed to the coupling at a much lower pressure and/or volume, it only gradually fills the clutch chamber thus giving a perfect resilient drive and obviating any damage by changing direction or rotation of parts having relatively large mass inertia.

In carrying my invention into effect in one convenient manner I provide a gas or steam turbine which is adapted at all times to run in one direction of rotation, and I arrange the turbine to drive the propeller, locomotive driving wheel, or other part to be driven through a reversing gear which may be bolted direct to the turbine casing or the turbines may be bolted on to the gear casing or the reversing mechanism may form a separate unit altogether or be otherwise suitably arranged and which may if necessary provide also for speed reduction or variation. The reversing mechanism may be of the common bevel reverse type, or it may involve separate gears for ahead and astern running or may be of any other suitable construction provided only that the selection of the particular direction of rotation is achieved by the engagement and disengagement of one or more pressure fluid operated couplings.

I can of course also provide for such a reversing mechanism, either with or without a speed ratio between input and output shaft in the case where more than one complete turbine unit is used for driving the output shaft, and such reversing mechanism may be arranged to reverse the output shaft quite independent from the number of turbine units which are driving. Furthermore, the reversing mechanism is such that in the case of a multi-unit driven shaft, by suitable arrangement of the control means, it will be impossible to connect one or more units for one direction of rotation while the other unit or units are driving in the opposite direction of rotation. I may also drive from each input shaft the driving member of more than one set of pressure fluid operated couplings for ahead and astern running should such an arrangement be advantageous in any particular application of my invention.

The supply of pressure fluid to the coupling or couplings is capable of control through a dashpot or a reducing valve or otherwise such that at the point where a change in the direction of drive is required, the fluid is admitted gradually at relatively low pressure and/or volume until such time as the required direction of running has been established after which the pressure of the fluid may be increased to the normal working pressure of approximately 60 to 70 lbs./sq. inch gauge pressure or other desired pressure. In this way, I establish a resilient drive which will enable the inertia of the rotating parts to be safely absorbed without any risk of damage to the parts.

In the foregoing, I have described how the necessary resilience of the reversing mechanism is obtained by regulation of pressure and rate of flow of the operating fluid to the coupling or couplings but I can, of course, also apply the fluid to the coupling or couplings at a constant rate of flow and pressure and effect the desired regulation of the fluid condition in the clutch chambers by means of a control device which is inserted in the fluid outlet circuit from the couplings or by a combination of the two principles as for instance in such a way that a counterfluid pressure and flow works in parallel or against the aforementioned fluid flow to or from the couplings.

It will be understood that the invention extends broadly to the use of a reversing mechanism with a turbine actuated by pressure fluid means adapted to operate initially at relatively low and gradually increasing pressure and/or volume and to be subsequently increased to the working pressure and volume, and the invention therefore is not to be limited to any particular form of reversing mechanism which may be suitably chosen depending upon the form of drive to which the invention is to be applied.

However, while I prefer to use pressure fluid operated couplings, such as described and claimed for example in the specification of British Patents Nos. 382,865 and 438,563, other types of pressure fluid operated couplings may be employed and in particular such couplings as will permit or have efficient lubrication of the contact faces and also have a continuous flow of fluid through the coupling, thus the operating fluid acting as a cooling medium which will efficiently dissipate any heat which will be generated in the coupling at the moment the masses are reversed. The couplings as described in the aforementioned British patents have to a more or lesser degree this feature of continuous pressure fluid flow through the coupling members inherent, but if required, they are adapted to have the fluid flow and lubrication modified should this be found to be advisable in any particular application. It must further be understood, that this reversing mechanism in its fully engaged or final drive position in either direction of rotation constitutes a means of drive which does not entail any slip whatsoever under the power condition for which it is designed and therefore no constant slip losses with heat generation occur as, for instance, is the case in drives and/or reversing mechanism wherein the power is transmitted by means of a fluid. Any of the aforementioned alterations in the coupling temperatures which I use in my invention purely occur during the actual reversing period and until the direction and speed of rotation of the masses which have been reversed is again in unison with the prime mover and its designed speed ratio.

The control of engagement and disengagement of any of the couplings within the mechanism has not been particularly mentioned, but it is of course understood that in this invention may be incorporated any suitable form of control or operating valve with the required accessories so as to obtain the desired effect of engagement and disengagement of the couplings. Such controls may or may not be interlocked with the speed control of the prime movers.

The drawings show by way of example two embodiments of the invention in which

Figure 1 shows a longitudinal section of the coupling while

Figure 3 is a diagrammatic arrangement of another embodiment while

Figure 1:
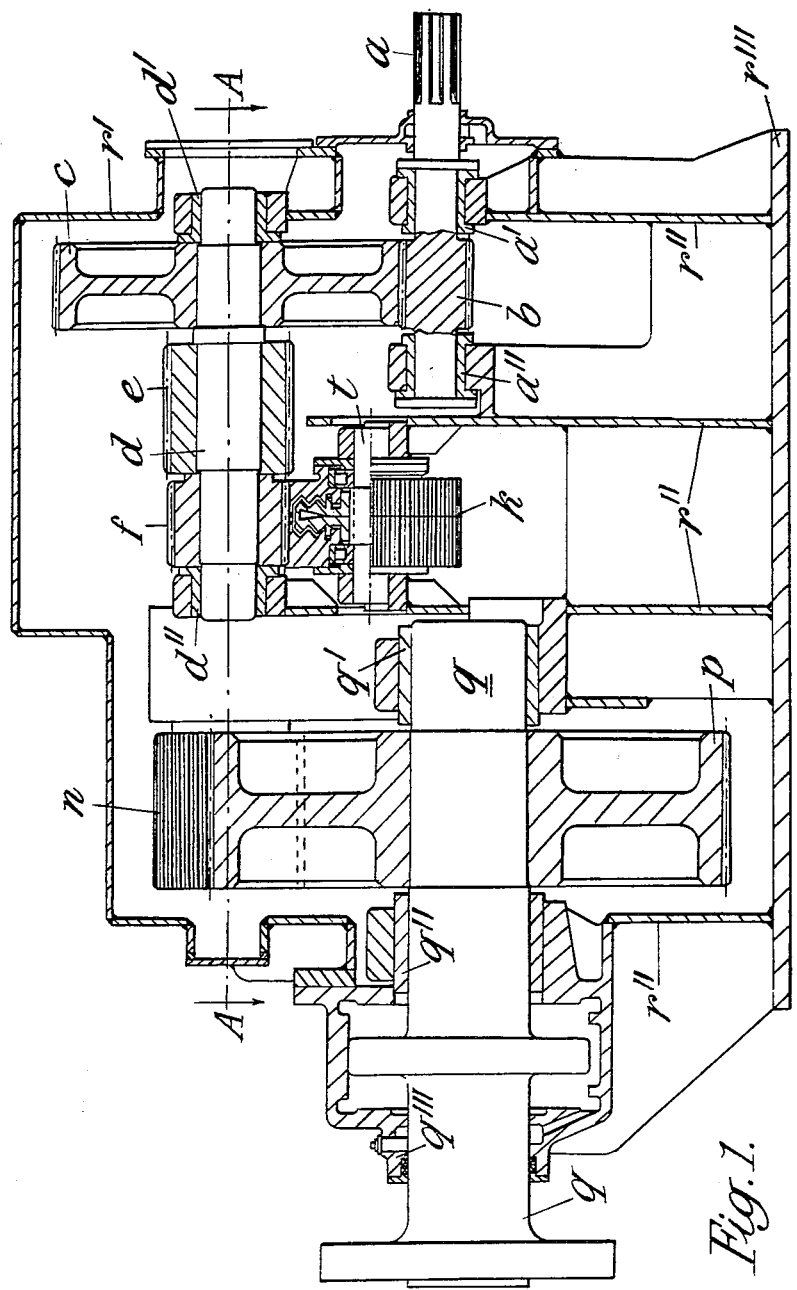
Figure 2:
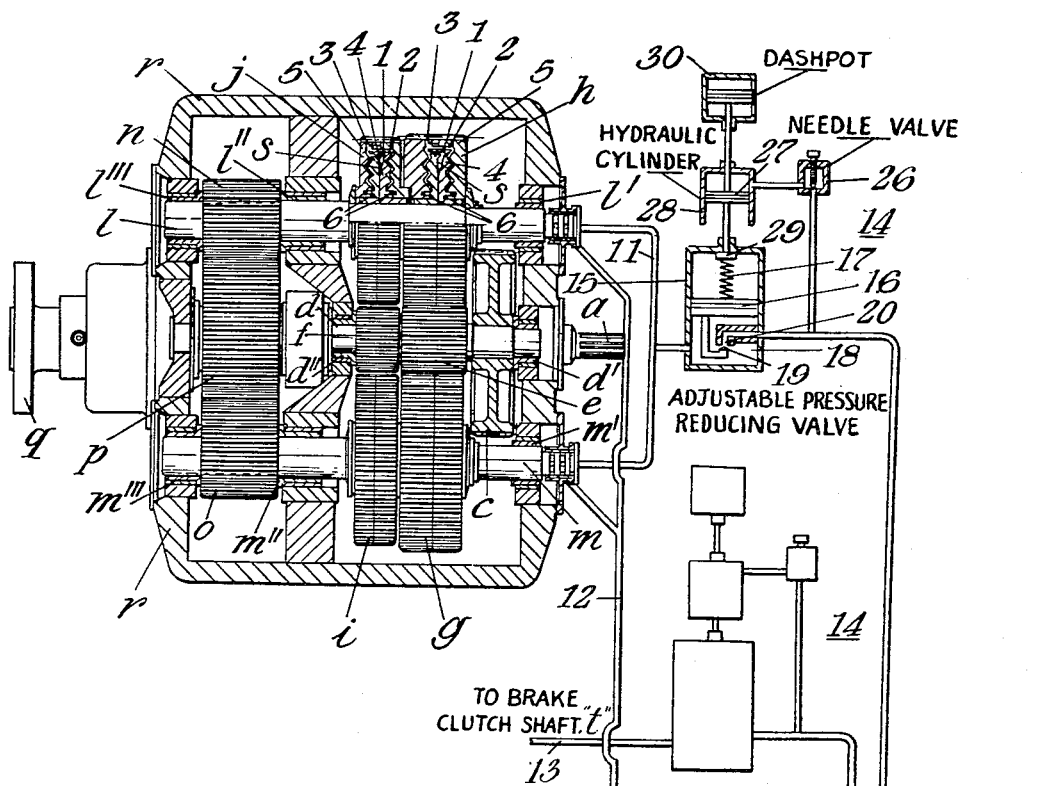
Figure 2 shows a plan of the same along the line A—A of Figure 1.
Figure 2A:
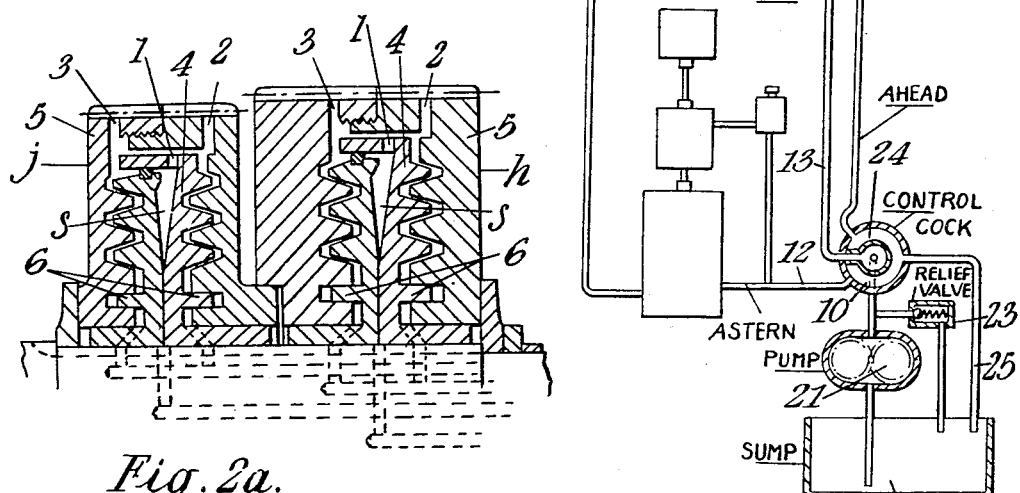
Figure 2A is a vertical sectional view on an enlarged scale of the clutch in one of the pinions shown in Figure 2.

In Figures 1 and 2, $a$ is the input shaft which is driven by one or more turbines not shown always in the same direction. This shaft, which is supported in the bearings $a'$ and $a''$ has the pinion $b$ formed thereon for driving the intermeshing gear wheel $c$ drivingly supported on the driving shaft $d$ which rotates in bearings $d'$ and $d''$. This shaft also has the forward and reverse pinions $e$ and $f$ rigidly attached thereto, the former engaging directly the clutched pinions $g$ and $h$ while the latter drives the clutched pinions $i$ and $j$ through the idler wheel $k$ which is capable of being braked. The clutched pinions $h$ and $i$ are mounted upon the intermediate shaft $l$ while the clutched pinions $i$ and $g$ are mounted on the intermediate shaft $m$. These shafts are supported in the bearing $l'$, $l''$ and $l'''$ and $m'$, $m''$ and $m'''$ respectively.

The intermediate shafts $l$ and $m$ also carry the gear wheels $n$ and $o$ which impart the drive to the common gear wheel $p$ on the output shaft $q$ supported in the bearings $q'$, $q''$ and $q'''$. All the above referred to bearings are supported in a main frame $r$ which is enclosed above by the casing $r'$ and supported below on the webs $r''$ from the base plate $r'''$.

The fluid operated friction clutches in the pinions $g$, $h$, $i$ and $j$ are constructed substantially in accordance with the before referred to specifications and are operated by the introduction of the fluid to the spaces $s$ by way of channels formed in the shaft $l$ not shown. The fluid is introduced under pressure which is controlled by a dashpot, reducing valve or other controlling means either to the forward or reverse pinions to engage either one or the other so that the drive is taken up slowly as the pressure is increased to the normal working pressure.

The fluid pressure operated clutches in the pinions $g$, $h$, $i$ and $j$ and the brake $k$ operate in a similar manner. As previously mentioned, a restricted orifice is provided so that when the clutch is engaged, the air can be driven out through such orifice and each pinion has a number of restricted orifices 1 around the periphery of the clutch through which air enters the clutch space $s$ when the clutch is disengaged. When the liquid is introduced into the said space to engage the clutch the air is driven out by way of orifice 1 and the bleed holes 2 and 3, which constitute the means for the continuous flow of fluid through the coupling the area of said restricted orifice 1 being such that a resilient gaseous pressure is built up in the air, said pressure causing the movable plates 4 to engage the fixed plates 5. This resilient pressure continues so long as there is air in the space $s$ after which a more positive engagement is effected owing to the slower rate at which the liquid can escape through the orifice 1.

The liquid is introduced under pressure controlled by an adjustable dashpot, or other adjustable liquid pressure operated liquid pressure controlling means selectively either to the forward or reverse pinions to engage the one or the other, so that the drive is taken up slowly as the pressure is increased to the normal working pressure.

When the flow of liquid to the spaces $s$ is reduced or prevented, the liquid is removed from said spaces by centrifugal action, air taking its place. The inner plates 4 are separated from the outer one 5 either by spring means or fluid pressure applied to the spaces 6 in the known manner.

It is preferable to arrange the restricted orifices in the periphery of the cavity and the output member so that besides acting to allow of the entrance of air on disengagement and exit of air on engagement they also provide for continuous flow of liquid through the coupling.

The size of the orifices or holes is determined by a number of requirements. If any substantial pressure is to be built up in the pressure cavity by the liquid when the cavity is full, the total area of the holes must be less than that of the channel feeding the cavity (seeing that the said holes feed to an open space around the hollow member). If a resilient air pressure is to be exerted as the cavity is filled with liquid, then these holes must offer a resistance to the exit of air. The size of the holes is related to the period of time over which resilience is required and the pressure exerted by the entrance of the liquid at this stage of engagement. On the other hand the holes must be of sufficient size to afford adequate flow to allow of a continuous flow of liquid to keep the clutch cool during slipping.

The fluid operated friction brake on the idler wheel $k$ is constructed in a similar manner to the clutches, the one frictional member being formed as part of the gear wheel while the central friction members are splined on a fixed shaft $t$ so that when the brake is engaged the rotation of the idler wheel is braked and thus the input shaft is also braked. This brake is also fed with liquid by channels formed in the shaft $t$ in the known manner.

The arrangement for the supply of liquid to the various clutches is shown to the right of Figure 2, in which a three-position control cock 10 is provided which is common to the circuits for ahead conduit 11, astern conduit 12 and the brake conduit 13 on shaft $t$. There is provided in each circuit pressure control means 14, one of which is shown in cross section and comprises an automatically adjustable pressure reducing valve 15 having a piston 16 movable against the compression spring 17 by the pressure built up in the space 18 to regulate the position of the needle 19 in respect of the seating 20.

The liquid is provided under pressure by the pump 21 from the sump 22, a relief valve 23 being provided to relieve excess pressure provided by the pump. The cavity 24 is connected to the sump and allows the fluid to drain back from the pressure reducing valve during disengagement by way of the pipe 25.

In order that the characteristics of the reducing valve 5 may be manually adjustable, an adjustable needle valve 26 is provided by way of which liquid is fed to the space above the piston 27 in the hydraulic cylinder 28, thereby lowering the abutment 29 of the spring 17 and thus increasing the pressure in the space 18 at which a corresponding aperture is provided at the needle valve 19, 20. The rate at which the piston 27 moves to affect the spring 17 is governed by a dashpot 30.

The above pressure control means are described by way of example only as other known means may be substituted for the same purpose if desired.

The three control means indicated operate in the same manner.

Figure 3:
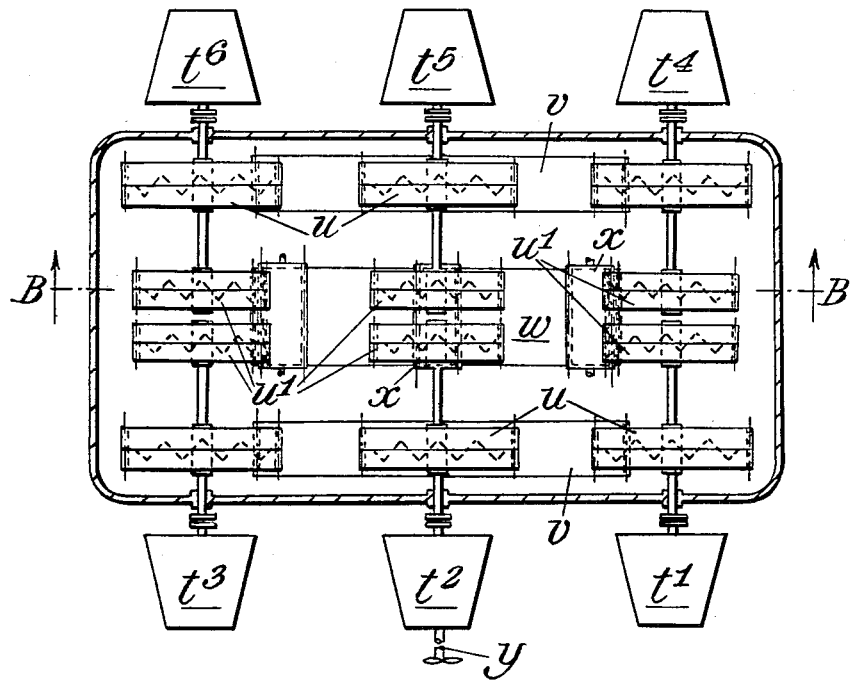
Figure 4:
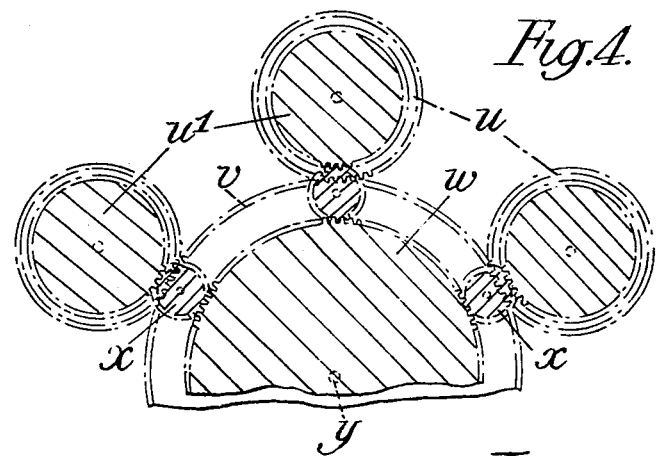
Figure 4 is a cross section through line B—B of Figure 3.

The Figures 3 and 4 show diagrammatically an arrangement in accordance with the invention in which six turbines $t'-t^6$ drive one output shaft in a ship. The three turbines $t'$, $t^2$, $t^3$ to one side of the arrangement of gears can for example be high pressure, intermediate pressure and low pressure units respectively while alternatively the three turbines $t^4$, $t^5$, $t^6$ on the other side can be high pressure, intermediate pressure and low pressure respectively, both arrangements being commonly provided. Whatever the arrangements of the turbines are each of these are coupled to a driving shaft having forward and reverse gears $u$ and $u'$ the former driving the final wheels $v$ directly and the latter driving the final wheel $w$ through the idler wheels $x$, the final wheels $v$ and $w$ being fixed upon the output shaft $y$. Each of the forward and reverse pinions $u$ and $u'$ have clutches, diagrammatically represented by the zig-zag lines, associated therewith as previously described with reference to the first embodiment by which the direction and speed of engagement of the drives can be controlled. The idlers $x$ can also be provided with fluid actuated clutches acting as brakes if desired as before described.

The embodiments of the invention hereinbefore specifically described are to be understood to be examples only. The type of clutch used, the form of reverse gearing used, the means for controlling the fluid pressure and other details for carrying the invention into effect may be varied without departing from the scope of the invention.

I claim:

1. Pressure liquid operated coupling system comprising a pressure liquid operated friction clutch having a cavity into which pressure liquid is introduced to engage the clutch, the clutch being provided with orifice means of restricted cross sectional area communicating between the said cavity and the exterior of the clutch, by means of which the pressure liquid may escape and become substituted by air in the disengaged condition of the same, means for supplying pressure liquid to the clutch and means for controlling the flow of the liquid to the clutch, so that when the volume of the liquid in the cavity is increased by operation of the control means to engage the clutch, the air contained therein is driven out by way of the orifice means, the latter being of such size that, while the cavity is being filled a resilient gaseous pressure exists therein.

2. System as claimed in claim 1 in which the control means is a dash pot.

3. System as claimed in claim 1 in which the control means is a variable pressure reducing valve.

4. System as claimed in claim 1 in which the control means is a counterpressure working against a constant pressure in the fluid flow of the clutch.

5. Pressure liquid operated power transmission coupling comprising input shaft means, at least one forward and at least one reverse pinion on the input shaft means mounted for rotation with the same, intermediate shaft means, pinions freely mounted on the intermediate shaft means engaging with forward and reverse pinions on the input shaft means, output shaft means, intermeshing gearing on the intermediate shaft means engaging gearing on the output shaft means to drive the latter, a liquid pressure operated friction clutch associated with each of the pinions on the intermediate shaft means to drivingly connect the same selectively with their associated intermediate shaft means, each clutch having a cavity into which pressure liquid is introduced to engage the same, each clutch being provided with orifice means of restricted cross sectional area communicating between the said cavity and the exterior of the clutch by means of which the pressure liquid may escape and be substituted by air in the disengaged condition of the same, means for supplying pressure liquid to the clutches and means for selectively controlling the flow of liquid to the clutches, so that when the volume of the liquid in each clutch cavity is increased by the operation of the control means to engage that clutch the air contained therein is driven out by way of the orifice means, the latter being of such size that while the cavity of each clutch is being filled a resilient gaseous pressure exists therein.

6. Coupling as claimed in claim 5 in which a friction brake is fitted between the input shaft means and the frame of the machine so that said shaft means may be braked when the drive of the coupling is rendered discontinuous while changing gear.

7. Coupling as claimed in claim 5 in which a friction brake is fitted between the input shaft means and the frame of the machine comprising a clutch of the kind fitted to the forward and reverse pinions on the intermediate shaft means, so that the input shaft means may be braked when the drive of the coupling is rendered discontinuous while changing gear.

8. Coupling as claimed in claim 5 in which each indirect engagement between a pinion and the intermediate shaft means is by way of an idler wheel, a friction brake being fitted between the idler wheel and the frame of the machine.

9. Coupling as claimed in claim 5 in which the forward and reverse gearing consists of a number of units each of which comprises a forward and reverse gear, each unit being provided with an input shaft and being connected to the output shaft means by intermeshing gearing.

10. Coupling as claimed in claim 5 in which speed reducing or increasing gearing is incorporated in the coupling.

References Cited in the file of this patent

UNITED STATES PATENTS

| | | |
|---|---|---|
| 2,289,991 | Paxman | July 14, 1942 |
| 2,335,926 | Fawick | Dec. 7, 1943 |
| 2,344,046 | Le Tourneau | Mar. 14, 1944 |
| 2,361,190 | Gerst | Oct. 24, 1944 |
| 2,417,198 | Hindmarch | Mar. 11, 1947 |
| 2,419,906 | Mills | Apr. 29, 1947 |
| 2,464,538 | Vanderzee | Mar. 15, 1949 |
| 2,536,549 | Hindmarch | Jan. 2, 1951 |

FOREIGN PATENTS

| | | |
|---|---|---|
| 931,501 | France | Oct. 27, 1947 |